United States Patent
Yasuda et al.

(10) Patent No.: US 9,065,084 B2
(45) Date of Patent: Jun. 23, 2015

(54) STEEL FOR SOLID OXIDE FUEL CELL HAVING EXCELLENT OXIDATION RESISTANCE

(75) Inventors: Nobutaka Yasuda, Yasugi (JP); Toshihiro Uehara, Yasugi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 13/496,347

(22) PCT Filed: Sep. 10, 2010

(86) PCT No.: PCT/JP2010/065604
§ 371 (c)(1),
(2), (4) Date: Mar. 15, 2012

(87) PCT Pub. No.: WO2011/034002
PCT Pub. Date: Mar. 24, 2011

(65) Prior Publication Data
US 2012/0177530 A1    Jul. 12, 2012

(30) Foreign Application Priority Data
Sep. 16, 2009  (JP) .................. 2009-214525
Jun. 25, 2010  (JP) .................. 2010-145373

(51) Int. Cl.
*C22C 38/42* (2006.01)
*C22C 38/50* (2006.01)
(Continued)

(52) U.S. Cl.
CPC ............ *H01M 8/021* (2013.01); *C22C 38/005* (2013.01); *C22C 38/02* (2013.01); *C22C 38/04* (2013.01);
(Continued)

(58) Field of Classification Search
CPC ........ C22C 38/04; C22C 38/02; C22C 38/06; C22C 38/44; C22C 38/42; C22C 38/004; C22C 38/50; C22C 38/005; C22C 38/40; C22C 19/05; C22C 38/18
USPC ........................................... 420/40
See application file for complete search history.

(56) References Cited

U.S. PATENT DOCUMENTS 5,096,514 A    3/1992  Watanabe et al.
2003/0063994 A1*  4/2003  Uehara et al. .......... 420/40
(Continued)

FOREIGN PATENT DOCUMENTS

CA    2748568 A1    7/2010
JP    03-257143 A    11/1991
(Continued)

OTHER PUBLICATIONS

Machine translation of JP2005320625A. Nov. 2005.*
Machine translation of JP2007-016297A, Jan. 2007.*
International Search Report of PCT/JP2010/065604, dated Nov. 22, 2010.
Canadian Office Action issued on Mar. 13, 2013 by the Canadian Patent Office in Canadian Application No. 2,774,035.
(Continued)

*Primary Examiner* — Jie Yang
*Assistant Examiner* — Xiaowei Su
(74) *Attorney, Agent, or Firm* — Sughrue Mion, PLLC

(57) ABSTRACT

Disclosed is steel for a solid oxide fuel cell, which has excellent oxidation resistance, reduces Cr evaporation, has good electrical conductivity and has a thermal expansion coefficient similar to that of a ceramic component such as an electrolyte or an electrode. Specifically disclosed is steel for solid oxide fuel cells, which has excellent oxidation resistance and contains, in mass %, 0.1% or less of C, 0.2% or less of Al, 0.2% or less of Si, 0.4% or less of Mn, 16.0-28.0% of Cr, 1.5% or less of Ni, 1.0% or less of REM and/or Zr in total, 1.0-3.0% of W, and more than 0.2% but 4.0% or less of Cu, with the balance made up of Fe and unavoidable impurities.

4 Claims, 2 Drawing Sheets

(51) Int. Cl.
  *H01M 8/02* (2006.01)
  *C22C 38/00* (2006.01)
  *C22C 38/02* (2006.01)
  *C22C 38/04* (2006.01)
  *C22C 38/06* (2006.01)
  *C22C 38/20* (2006.01)
  *C22C 38/22* (2006.01)
  *C22C 38/44* (2006.01)
  *H01M 8/12* (2006.01)
  *C22C 1/02* (2006.01)

(52) U.S. Cl.
  CPC ............... *C22C 38/06* (2013.01); *C22C 38/20* (2013.01); *C22C 38/22* (2013.01); *C22C 38/42* (2013.01); *C22C 38/44* (2013.01); *C22C 38/50* (2013.01); *H01M 8/0232* (2013.01); *H01M 8/12* (2013.01); *H01M 2008/1293* (2013.01); *Y02E 60/521* (2013.01); *Y02E 60/525* (2013.01); *C22C 1/02* (2013.01)

(56) References Cited

U.S. PATENT DOCUMENTS

2007/0144634 A1* 6/2007 Miyazaki et al. ............ 148/610
2009/0104494 A1   4/2009 Quadakkers et al.
2010/0098994 A1   4/2010 Schuisky et al.

FOREIGN PATENT DOCUMENTS

| JP | 10-280103 A | 10/1998 |
| JP | 2005-320625 A | 11/2005 |
| JP | 2006-009056 A | 1/2006 |
| JP | 2007-016297 A | 1/2007 |
| JP | 2010-013727 A | 1/2010 |
| KR | 10-2006-0127079 A | 12/2006 |
| WO | 2007/093148 A1 | 8/2007 |
| WO | 2008/013498 A1 | 1/2008 |

* cited by examiner

STEEL FOR SOLID OXIDE FUEL CELL HAVING EXCELLENT OXIDATION RESISTANCE

CROSS REFERENCE TO RELATED APPLICATIONS

This application is a National Stage of International Application No. PCT/JP2010/065604 filed Sep. 10, 2010, claiming priority based on Japanese Patent Application Nos. 2009-214525 filed Sep. 16, 2009, and 2010-145373 filed Jun. 25, 2010, the contents of all of which are incorporated herein by reference in their entirety.

TECHNICAL FIELD

The invention relates to a steel for solid oxide fuel cells, having improved oxidation resistance.

BACKGROUND OF THE INVENTION

Solid oxide fuel cells have properties such as high power generation efficiency, low emission of SOx, NOx and $CO_2$, good responsiveness to a fluctuation of load, and compactness. Thus, solid oxide fuel cells are expected to be applied to various power generation systems such as large-scale centralized type, suburban distributed type, and home power generation systems, as an alternative for thermal power generation. Under such situation, ceramics have been mainly used for parts for solid oxide fuel cells, such as separators, interconnectors and current collectors, since the parts are required to have good oxidation resistance, good electrical conductivity, and thermal expansion coefficient close to those of electrolytes and electrodes at a high temperature around 1000° C.

However, ceramics have poor workability and are expensive. Furthermore, an operation temperature of solid oxide fuel cells has been reduced to around 700 to 900° C. in recent years. Thus, studies have been actively made to use metallic materials for parts such as separators since metallic materials are less expensive and have better workability and oxidation resistance than ceramics.

The metallic parts for solid oxide fuel cells are required to have excellent oxidation resistance. The applicant has proposed ferritic stainless steels with excellent oxidation resistance in JP-A-2007-16297 (Patent Literature 1), JP-A-2005-320625 (Patent Literature 2), and so on.

PATENT LITERATURE

Patent Literature 1: JP-A-2007-016297
Patent Literature 2: JP-A-2005-320625

SUMMARY OF INVENTION

While the ferritic stainless steels proposed by the applicant have excellent oxidation resistance and electrical conductivity, there have been growing demands for metallic materials to have more excellent oxidation resistance in order to further improve durability of solid oxide fuel cells.

Furthermore, a problem has been revealed that Cr evaporates from a Cr oxide layer on the metallic material and thus oxides containing Cr are formed on a surface of ceramic parts or an interface between ceramic parts such as electrodes of fuel cells, thereby deteriorating a performance of fuel cells.

It is an object of the invention to address the demands and to provide a steel for solid oxide fuel cells having improved oxidation resistance and reduced evaporation of Cr, as well as having good electrical conductivity and a thermal expansion coefficient similar to those of ceramic parts such as electrolytes and electrodes.

The inventors have conducted a study on chemical compositions for improving oxidation resistance based on the ferritic stainless steels proposed in Patent Literatures 1 and 2.

As a result, it has been found that oxidation resistance can be improved by minimizing amounts of C, Si and Al as impurity elements. It has been also found that reducing amount of Mn, which forms a spinel-type oxide layer together with Cr at the top surface of the ferritic stainless steels, decrease a growth rate of the oxide layer, thereby improving oxidation resistance.

Furthermore, the inventors have conducted a study on alloying elements and the amounts thereof for more securely reducing evaporation of Cr from a metallic part, since the evaporation degrades a performance of a ceramic part such as electrodes when the metal is used for example as a separator or an interconnector in solid oxide fuel cells. As a result, it has been found that an appropriate amount of Cu is effective to reduce the evaporation of Cr from oxide layers on the metal surface. It has been also found that W is effective for suppressing outward diffusion of Cr. Furthermore, a study was conducted on an appropriate content of each element which allows drastic improvement of suppressing the evaporation of Cr, thereby obtaining the invention.

Thus, the invention provides a steel for solid oxide fuel cells having improved oxidation resistance. The steel comprises, by mass percent, C: not more than 0.1%, Al: not more than 0.2%, Si: not more than 0.2%, Mn: 0.05 to 0.4%, Cr: 16.0 to 28.0%, Ni: not more than 1.5%, one or more of REM and Zr: not more than 1.0% in total, W: 1.0 to 3.0%, Cu: more than 0.2% and not more than 4.0%, and the balance being Fe and impurities.

A preferable range of Cu is more than 0.2% and not more than 2.0% by mass percent, and a more preferable range is Mn: 0.1% to 0.35%, Cr: 18.0 to 26.0%, Ni: 0.1 to 1.0%, and one or more of REM and Zr: 0.01 to 0.85% in total.

Preferably, La is selected for REM, and added in combination with Zr. La and Zr are preferably added in combination in a range of La: 0.005 to 0.10% and Zr: 0.01 to 0.80%, wherein La+Zr: 0.01 to 0.85%.

A particularly preferable range is Al: not more than 0.1%, and Si: not more than 0.1%, by mass percent. Further preferable range is C: not more than 0.05%, Al: not more than 0.05%, and Si: not more than 0.05%.

A more preferable composition of the invention is, by mass percent, C: not more than 0.05%, Al: not more than 0.05%, Si: not more than 0.05%, Mn: 0.1 to 0.35%, Cr: 21.0 to 25.0%, Ni: 0.2 to 0.8%, La: 0.005 to 0.10%, Zr: 0.01 to 0.80% wherein La+Zr: 0.01 to 0.85%, W: 1.0 to 2.5%, Cu: 0.4 to 2.0%, and the balance being Fe and impurities.

Further preferably, a total amount of C, Si and Al is not more than 0.12%.

The steel for solid oxide fuel cells according to the invention can have drastically improved oxidation resistance and reduced evaporation of Cr, thereby significantly suppressing a degradation of a performance of fuel cells. Moreover, maintained are good electrical conductivity of the steel and a small difference of thermal expansion between the steel and the electrolyte or electrode material. Therefore, the invention can greatly contribute to an improvement of durability and high performance even when it is used for a metallic part in the solid oxide fuel cell, such as a separator, an interconnector and so on which is required to have high performance.

DETAILED DESCRIPTION OF THE INVENTION

Figure 1:
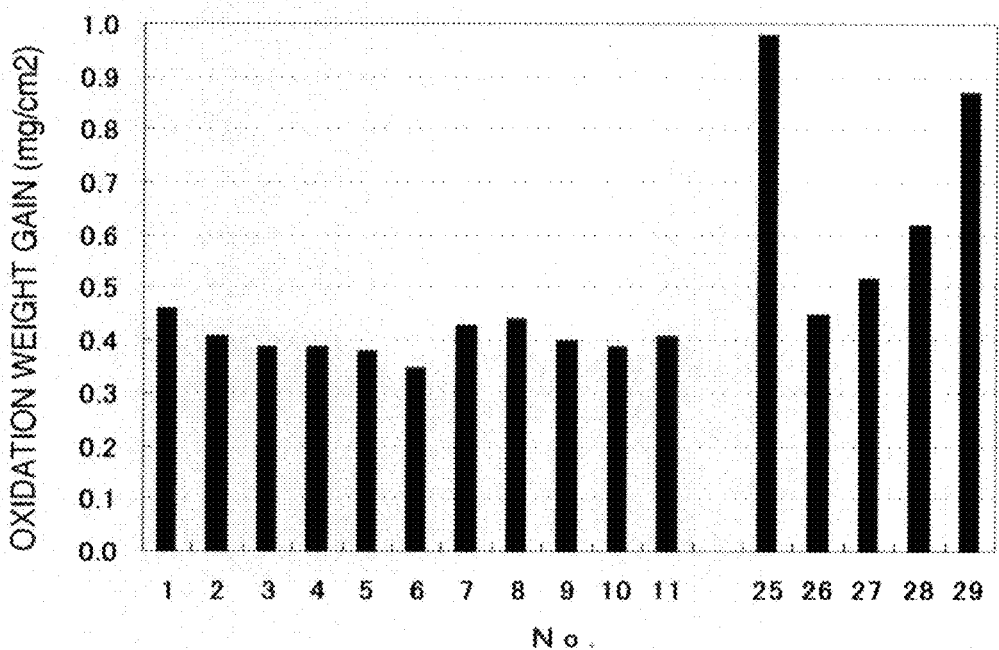
FIG. 1 is a diagram showing a test result of oxidation weight gain.

An important characteristics of the invention lies in a composition based on the ferritic stainless steel containing one or more of REM and Zr as proposed by the applicant. In the composition, an amount of impurity elements is limited to a low level, W is added for a purpose of suppressing outward diffusion of Cr and Cu is added to improve oxidation resistance. Thereby, oxidation resistance can be improved and a decline of performance of the fuel cells can be suppressed. Hereafter, the invention will be described in detail.

A reason why the content of each element in the steel for solid oxide fuel cells according to the invention is specified is as follows. The content of each element is indicated by mass percent. First, a reason of addition of each indispensable element and its content will be described.

Cr: 16.0 to 28.0%

Cr (Chromium) is necessary to form a dense Cr oxide layer, typically $Cr_2O_3$, at operating temperatures of solid oxide fuel cells and to realize excellent oxidation resistance. Moreover, Cr is also an important element to maintain electrical conductivity. Therefore, Cr is required to be contained by 16.0% at minimum.

However, excessive addition of Cr is not much effective in the improvement of oxidation resistance, but rather causes deterioration of workability. Thus, its upper limit is defined to be 28.0%. A preferable range of Cr is 18.0 to 26.0%. More preferably, the upper limit of Cr is 25.0% and the lower limit is 20.0%. A further preferable lower limit is 21.0%.

One or more of REM and Zr: not more than 1.0%

A small amount of REM (rare earth element) or Zr (zirconium) makes an oxide film dense or improves adhesion strength of the oxide layers, and thus has an effect in significantly improving oxidation resistance and electrical conductivity of the oxide layers.

Since the oxidation resistance is obtained mainly by a formation of a dense Cr oxide layers in the invention, singular or combined addition of REM and Zr is indispensable to improve the adhesion strength of the Cr oxide. Thus, one or more elements of REM and Zr are added indispensably by exceeding no-addition level (0%).

However, the amount of one or more of REM and Zr are limited to be not more than 1.0% in total, since excessive addition thereof deteriorates hot workability. A preferable range is 0.01 to 0.85%, and more preferably they may be added singularly or in combination in a range of 0.005 to 0.10% of REM and 0.01 to 0.85% of Zr. REM may include La, Ce, Y, Nd and mixtures thereof.

It is preferable to select La among the rare earth elements and added in combination with Zr, since La has an excellent effect of improving oxidation resistance at a high temperature.

La and Zr have an effect of significantly improving oxidation resistance and electrical conductivity of oxide layers when they are added in combination, respectively in a small amount. When La and Zr are added in combination, a total amount of La and Zr is determined to be not more than 1.0%, preferably 0.01 to 0.85%. Preferable respective contents of La and Zr are in a range of 0.005 to 0.10% of La and 0.01 to 0.80% of Zr.

W: 1.0 to 3.0%

In general, Mo (molybdenum) is known to have the same effect as W (tungsten), regarding solid solution strengthening and the like. However, it is found that W is more effective in suppressing outward diffusion of Cr during oxidation at operating temperatures of solid oxide fuel cells, compared with Mo. Therefore, W is indispensably added solely in the invention.

After formation of the Cr oxide layers, decrease of an Cr content in the alloy is suppressed since the outward diffusion of Cr is reduced by the addition of W. Moreover, W can also prevent anomalous oxidation of the alloy and maintain excellent oxidation resistance. In order to obtain the effect, at least 1.0% of W is required. Since more than 3.0% of W deteriorates hot workability, an upper limit of W is determined to be 3.0%. Preferable range is 1.0 to 2.5%.

Cu: more than 0.2% and not more than 4.0%

Figure 3:
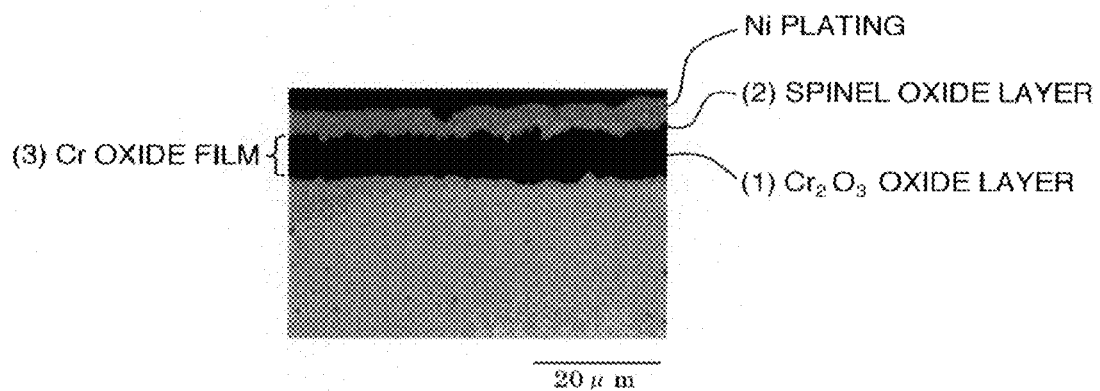
FIG. 3 is a cross-sectional microphotograph of the steel after forming oxide layers for a solid oxide fuel cells according to the invention.

The steel for solid oxide fuel cells according to the invention has Cr oxide layers (3) having a two-layer structure including a $Cr_2O_3$ oxide layer (1) and a spinel-type oxide layer (2) containing Mn on the $Cr_2O_3$ oxide layer, as shown in FIG. 3, at operating temperatures of around 700 to 900° C.

Cu has an effect of making the spinel-type oxide containing Mn dense and suppresses an evaporation of Cr from the $Cr_2O_3$ oxide layer. For the reason, Cu is indispensably added up to 4.0%. Even if more than 4.0% Cu is added, there is no further advantageous effect but there is a risk that hot workability degrades or a ferrite phase becomes unstable. Therefore, Cu is determined to be not more than 4.0%. A preferable range is not more than 2.0%.

The effect of Cu can be obtained when more than 0.2% Cu is indispensably added. In order to more securely achieve the effects, a lower limit of Cu is preferably set to be 0.4%.

Mn: 0.05 to 0.4%

Mn (manganese) forms a spinel-type oxide together with Cr. The spinel-type oxide layer containing Mn is formed on an outer side (surface side) of a $Cr_2O_3$ oxide layer. The spinel-type oxide layer has a protection effect of preventing Cr evaporation from the steel. The evaporated Cr forms a complex oxide deposited onto a ceramic part such as an electrolyte/electrode and causes the degradation of the performance of fuel cells. The spinel-type oxide acts disadvantageously for oxidation resistance since it usually has a larger oxidation rate compared with that of $Cr_2O_3$. However, it has an advantageous effect of maintaining a surface smoothness of the oxide layers and decreasing of contact resistance and preventing the evaporation of Cr which is poison to the electrolyte. For the reason, Mn is required up to 0.05%. A preferable lower limit of Mn is 0.1%.

Excessive addition of Mn increases growth rate of the oxide layers, thereby deteriorating oxidation resistance. Therefore, an upper limit of Mn is determined to be 0.4%, preferably 0.35%.

Ni: not more than 1.5%

Ni (nickel) is an austenite-forming element. When Ni is contained excessively, a ferrite-austenite binary phase structure is formed easily, thereby increasing a thermal expansion coefficient. Moreover, Ni may be inevitably added in the steel for example if raw melting materials include recycled materials when manufacturing a ferritic stainless steel. If a Ni content becomes excessive, there is a concern the contact decrease with a ceramic part. Thus, a large amount of Ni is not preferable.

On the other hand, there is concern that hot workability is deteriorated because of red shortness if Cu is contained in the steel of the invention. In order to prevent it, it is effective to add a small amount of Ni. Thus, Ni is added up to 1.5% in the invention. A preferable upper limit of Ni is 1.0%, and a more preferably 0.8%. Although the effect of Ni can be obtained when Ni is added exceeding a no-addition level (0%), and preferable lower limit of Ni is 0.1%, further preferable 0.2%, to achieve the effect more securely.

Next, those elements which should be controlled to improve oxidation resistance in the invention will be described in detail.

C: not more than 0.1%

Carbon (C) functions to form carbide to increase a high-temperature strength. On the contrary, carbon deteriorates workability and also decreases an amount of Cr which is effective in keeping oxidation resistance, since carbon combines with Cr. If Cr density in a matrix decreases below a critical value which is necessary for stably maintaining Cr oxide layers, the Cr oxide layers can not be maintained. Thus, it is effective to make carbon contents as low as possible, and carbon is limited in a range of not more than 0.1% in the invention. In order to securely achieve the effect by reducing the carbon content, an upper limit of carbon is determined to be 0.05%. A more preferable upper limit is 0.03%.

Si: not more than 0.2%

Si (silicon) forms a $SiO_2$ layer near an interface between a Cr oxide layers and a matrix at operating temperatures of solid oxide fuel cells. This means that Si in the matrix is oxidized by a small amount of oxygen which defuses into the matrix from an outside through the dense Cr oxide layers, thereby deteriorating oxidation resistance. Moreover, since an electrical resistivity of $SiO_2$ is higher than that of Cr, Si will reduce an electrical conductivity of the oxide layers. When more than 0.2% of Si is contained, the $SiO_2$ layer is formed. Although it is thin and discontinuous, it deteriorates oxidation resistance and electrical conductivity. Thus, Si is limited to be in a range of not more than 0.2% in the invention. In order to more securely achieve the effect by reducing Si, an upper limit of Si is determined to be 0.1%, more preferably 0.05%. Preferably, Si content is not more than 0.03%, and it is not a problem even if no Si is added.

Al: not more than 0.2%

Al (aluminum) forms $Al_2O_3$ in granular and acicular shapes in a metal matrix in a vicinity of Cr oxide layers at operating temperatures of solid oxide fuel cells. This indicates that Al in a matrix is oxidized by a small amount of oxygen which defuses into the matrix from an outside through the dense Cr oxide film, like the formation of $SiO_2$. This makes outward diffusion of Cr ununiformity and prevents stable formation of the Cr oxide layers, thereby deteriorating oxidation resistance.

Moreover, $Al_2O_3$ in the vicinity of the oxidation layers reduce electrical conductivity. When formation of $Al_2O_3$ in the vicinity of the oxide layers is limited to an extremely low level, excellent oxidation resistance and good electrical conductivity are obtained. Thus, Al is limited to a range of not more than 0.2% in the invention. In order to more securely achieve the effect by reducing Al, an upper limit of Al is determined to be 0.1%, and more preferably 0.05%. Prefer- ably, the Al content is not more than 0.03%, and it is not a problem even if no Al is added.

The above elements carbon, Si and Al can be used as a deoxidizer to reduce oxygen in the steel. For the reason, when deoxidizing is performed by carbon, Si and Al, an upper limit of each element is preferably controlled in the above range, and more preferably a total amount of carbon, Si and Al is controlled to be not more than 0.12%.

In the invention, it is assumed that the balance other than the above elements is Fe and inevitable impurities. Typical inevitable impurities and preferable upper limits thereof will be described below.

S: not more than 0.015%

Since sulfur (S) forms a sulfide-type inclusion with rare earth elements and decreases an effective amount of rare earth elements which are effective for oxidation resistance. Thus, sulfur not only reduces oxidation resistance by forming a sulfide, but also deteriorates hot workability and surface finish. Therefore, sulfur is preferably not more than 0.015%, more preferably not more than 0.008%.

O: not more than 0.010%

Oxygen (O) forms an oxide-type inclusion with Al, Si, Mn, Cr, Zr, rare earth and so on, thereby deteriorating hot workability and cold workability. Oxygen also reduces dissolved amounts of rare earth elements, Zr and so on which significantly contribute to an improvement of oxidation resistance, and thus reduces effects of these elements in improving oxidation resistance. Therefore, oxygen is preferably limited to be not more than 0.010%, more preferably not more than 0.009%.

P: not more than 0.04%

Phosphorous (P) is more likely to be oxidized than Cr that forms an oxidation layers, and deteriorates oxidation resistance. A phosphorous content is preferably limited to be not more than 0.04%, more preferably not more than 0.03%, further more preferably not more than 0.02%, and further more preferably not more than 0.01%.

N: not more than 0.05%

Nitrogen (N) is an austenite-forming element. When nitrogen is excessively contained in the ferritic stainless steel of the invention, it not only forms an austenitic phase so that the single ferritic phase is not able to be maintained, but also forms a nitride-type inclusion with Cr and so on. Thus, an amount of Cr in a matrix is reduced, and thereby oxidation resistance is deteriorated. Moreover, the inclusion may decrease hot workability and cold workability. Therefore, the nitrogen content is preferably limited to be not more than 0.05%, more preferably not more than 0.03%, and further more preferably not more than 0.02%.

B: not more than 0.003%

Boron (B) increases a growth rate of oxide layers at a high temperature of not less than about 700° C., thereby deteriorating oxidation resistance. Moreover, it increases a surface roughness of the oxide layers and decreases a contact area between the oxide film and an electrode, thereby increasing contact resistance. Therefore, the boron content is preferably limited to be not more than 0.003%, and preferably reduced to 0% as low as possible. A more preferable upper limit thereof is 0.002%, and further more preferably less than 0.001%.

H: not more than 0.0003%

When hydrogen (H) is contained excessively in a Fe—Cr based ferritic matrix, hydrogen is likely to be concentrated in a defect portion such as a grain boundary, and may cause hydrogen embrittlement, thereby generating cracking during manufacturing. Thus, hydrogen is preferably limited to be not more than 0.0003%. More preferably, the hydrogen content is not more than 0.0002%.

The steel for solid oxide fuel cells according to the invention suppresses Cr evaporation and has excellent oxidation resistance. Thus, it is suitably applied to, for example, separators, interconnectors, and current collecting parts. Of course, it can be also used for other parts such as bolts.

EXAMPLES

The invention will be described in more detail with the following examples. Steels according to the invention and comparative steels were melted with a vacuum induction furnace to produce 10 kg ingots. For the vacuum melting, raw materials having high purities are selected and melting conditions such as furnace atmosphere are controlled in order to lower carbon, Si, Al and impurity elements within determined values. Melting was performed in vacuum.

In particular, oxygen was strictly controlled as described below. Although it was generally essential to add a large amount of Al as a strong deoxidizing element to lower an oxygen content, the C, Si and Al contents should be lowered according to the invention and thus deoxidization possibly became insufficient. Accordingly, melting was performed with very strict control of operation conditions to lower the oxygen content. The addition of C, Si and Al was suppressed to a minimum necessary limit within a range by which a deoxidizing effect is obtained. Furthermore, raw materials with high purities were selected and melting was started when a pressure in a small scale experimental furnace became lower than $9 \times 10^{-2}$ Pa.

The materials having high purities were used this time since a small scale experimental furnace was used. In a case of mass production, however, there is concern that reducing of impurity elements with use of the high purity materials may take large cost. When the steel of the invention is to be produced in mass production, melting conditions, such as strictly selected raw materials, high vacuum in a furnace atmosphere, argon bubbling and the like or combination thereof, may be controlled.

Thereafter, the ingots were heated at 1100° C. and forged into square bars each having a side of 30 mm in length. Thereafter, the bars were annealed at 780° C. for one hour. Table 1 shows chemical compositions of steels Nos. 1 to 11 according to the invention, and comparative steels Nos. 21 to 29. The comparative steel No. 25 in Table 1 corresponds to the alloy disclosed in Patent Literature 1.

Impurity elements are not shown in Table 1 but they range H≤0.0003%, B<0.001%, N≤0.05%, O≤0.010%, P≤0.04%, and S≤0.015%.

TABLE 1

| No. | C | Al | Si | Mn | Cr | Ni | REM | Zr | W | Mo | Cu | Remarks (mass %) |
|---|---|---|---|---|---|---|---|---|---|---|---|---|
| 1 | 0.024 | 0.010 | 0.010 | 0.31 | 24.00 | 0.37 | La = 0.07 | 0.26 | 1.90 | — | 0.47 | Steel of the invention |
| 2 | 0.027 | 0.012 | 0.007 | 0.27 | 23.72 | 0.37 | La = 0.07 | 0.28 | 1.80 | — | 0.94 | |
| 3 | 0.026 | 0.012 | 0.008 | 0.26 | 23.68 | 0.38 | La = 0.07 | 0.27 | 1.70 | — | 1.44 | |
| 4 | 0.027 | 0.014 | 0.012 | 0.27 | 23.70 | 0.37 | La = 0.06 | 0.23 | 1.73 | — | 1.90 | |
| 5 | 0.023 | 0.009 | 0.011 | 0.18 | 23.51 | 0.37 | La = 0.06 | 0.23 | 1.73 | — | 1.96 | |
| 6 | 0.026 | 0.009 | 0.010 | 0.19 | 23.68 | 0.37 | La = 0.07 | 0.27 | 2.05 | — | 0.99 | |
| 7 | 0.028 | 0.010 | 0.009 | 0.30 | 24.02 | 0.92 | La = 0.07 | 0.24 | 1.92 | — | 0.98 | |
| 8 | 0.028 | 0.082 | 0.091 | 0.28 | 24.12 | 0.50 | La = 0.06 | 0.26 | 1.90 | — | 1.02 | |
| 9 | 0.045 | 0.078 | 0.152 | 0.27 | 23.98 | 0.71 | La = 0.07 | 0.24 | 1.95 | — | 1.23 | |
| 10 | 0.033 | 0.162 | 0.072 | 0.28 | 23.89 | 0.36 | La = 0.05 | 0.23 | 1.98 | — | 1.15 | |
| 11 | 0.063 | 0.012 | 0.023 | 0.25 | 24.11 | 0.45 | La = 0.07 | 0.27 | 2.01 | — | 1.88 | |
| 21 | 0.042 | 0.200 | 0.410 | 0.52 | 22.20 | 0.48 | La = 0.06 | 0.17 | — | — | — | Comparative steel |
| 22 | 0.023 | 0.210 | 0.102 | 0.46 | 21.76 | 0.74 | La = 0.07 | 0.32 | — | — | — | |
| 23 | 0.022 | 0.010 | 0.008 | 0.73 | 22.29 | 0.35 | La = 0.06 | 0.18 | — | — | — | |
| 24 | 0.026 | 0.009 | 0.007 | 0.95 | 24.36 | 0.38 | La = 0.05 | 0.19 | — | — | — | |
| 25 | 0.022 | 0.02 | 0.03 | 0.51 | 23.10 | 0.36 | La = 0.04 | 0.22 | — | — | — | |
| 26 | 0.031 | 0.010 | 0.01 | 0.27 | 23.83 | 0.38 | La = 0.09 | 0.25 | 1.98 | — | — | |
| 27 | 0.033 | 0.012 | 0.01 | 0.19 | 24.04 | 0.36 | La = 0.06 | 0.25 | — | 0.98 | 1.45 | |
| 28 | 0.034 | 0.010 | 0.01 | 0.19 | 23.96 | 0.36 | La = 0.05 | 0.27 | — | 1.97 | 1.48 | |
| 29 | 0.029 | 0.016 | 0.01 | 0.29 | 21.39 | 0.39 | La = 0.09 | 0.23 | — | — | — | |

Balance is Fe and inevitable impurities.

Specimens were cut out from the materials and were subjected to various tests.

First, a plate-like specimen of 10 mm (w)×10 mm (l)×3 mm (t) was used to measure oxidation weight gain after heating at 850° C. for 500 hours in air. The specimen after heating was used to measure electrical resistance at 750° C. in air. The electrical resistance was measured by a four-terminal method with a Pt mesh fixed to a specimen surface with Pt paste, and is represented by area resistivity (mΩ·cm2).

Next, a degree of suppressing anomalous oxidation was investigated. An extremely thin plate-like specimen of 15 mm (w)×15 mm (l)×0.1 mm (t) was used to measure an oxidation weight gain after heating at 850° C. for 500 hours in air. The test with 15 mm×15 mm×0.1 mm specimen was not conducted for steels which have a large oxidation weight gain with the plate-like specimen of 10 mm×10 mm×3 mm.

Next, a degree of suppressing evaporation of Cr was investigated. A plate-like specimen of 10 mm (w)×10 mm (l)×3 mm (t) was subjected to a heating at 850° C. for 30 hours in air with ceramic plates disposed below and above it. Thereafter, an amount of Cr deposited on the ceramic plates was measured by SEM (Scanning Electron Microscope) and EDX (Energy Dispersive X-ray Analyzer) analysis. During the heating, a gap of 0.4 mm was made between an upper surface of the specimen and the ceramic plate to avoid interaction through solid reaction. For EDX analysis, an area analysis was performed in a rage of about 230 μm×300 μm at middle of the deposited portion. The amount of evaporated Cr was relatively quantified with the comparative steel No. 25 as a reference (1.00) with use of the result of quantitative analysis of Cr with EDX.

Further, an average thermal expansion coefficient from 30° C. to 850° C. was measured.

The test results are summarized in Table 2.

C. after heating at 850° C. for 500 hours in air, since the steels have a thinner oxide layer which has higher electrical resistance in comparison with metals. The resistance is not greater than about ½ compared with those of the comparative steels Nos. 21 to 25. Thus, a good electrical conductivity was obtained.

All of the steels according to the invention have an average thermal expansion coefficient from 30 to 850° C. in an order of about $12 \times 10^{-6}/°$ C., which is close to that of stabilized zirconia of a solid electrolyte.

FIG. 1 shows oxidation weight gains of the thin plate-like specimens having a shape of 15 mm×15 mm×0.1 mm after a heating treatment at 850° C. for 500 hours in air.

As shown in the FIG. 1, the steels according to the invention exhibited drastic reduction of oxidation weight gains

TABLE 2

| | After heating at 850° C. for 500 hours | | | After heating at 850° C. for 30 hours | | |
|---|---|---|---|---|---|---|
| | Thick plate specimen 10 mm × 10 mm × 3 mm | | Thin plate specimen 15 mm × 15 mm × 0.1 mm | Thick plate specimen | Average thermal expansion coefficient | |
| No. | Oxidation weight gain (mg/cm$^2$) | Electrical resistance at 750° C. (mΩ · cm$^2$) | Oxidation weight gain (mg/cm$^2$) | 10 mm × 10 mm × 3 mm Amount of evaporated Cr | (30~850° C.) ($\times 10^{-6}/°$ C.) | Remarks |
| 1 | 0.24 | 4.0 | 0.46 | 1.01 | 12.3 | Steel of |
| 2 | 0.27 | 4.1 | 0.41 | 0.96 | 12.8 | the invention |
| 3 | 0.29 | 4.4 | 0.39 | 0.95 | 12.5 | |
| 4 | 0.31 | 4.3 | 0.39 | 1.04 | 12.8 | |
| 5 | 0.20 | 3.0 | 0.38 | 1.05 | 12.7 | |
| 6 | 0.26 | 3.5 | 0.35 | 1.17 | 12.7 | |
| 7 | 0.29 | 4.2 | 0.43 | 0.95 | 12.5 | |
| 8 | 0.34 | 5.8 | 0.44 | 0.97 | 12.8 | |
| 9 | 0.38 | 6.1 | 0.40 | 0.95 | 12.4 | |
| 10 | 0.39 | 6.2 | 0.39 | 0.91 | 12.7 | |
| 11 | 0.40 | 5.9 | 0.41 | 1.12 | 12.5 | |
| 21 | 1.10 | 16.4 | | | 12.4 | Comparative |
| 22 | 0.95 | 16.0 | | | 12.4 | steel |
| 23 | 1.02 | 15.9 | | | 12.5 | |
| 24 | 1.12 | 16.6 | | | 12.4 | |
| 25 | 0.77 | 10.1 | 0.98 | 1.00 | 12.6 | |
| 26 | 0.28 | 4.6 | 0.45 | 1.73 | 12.3 | |
| 27 | 0.23 | 5.0 | 0.52 | 1.73 | 12.6 | |
| 28 | 0.24 | 5.2 | 0.62 | 1.05 | 12.6 | |
| 29 | 0.30 | 5.0 | 0.87 | 1.82 | 12.3 | |

For the steels according to the invention, Cu and W were indispensably added, C, Si and Al contents were sufficiently limited and Mn content is reduced. Thus, the steels according to the invention showed extremely small oxidation weight gains not greater than about ⅓ compared with those of the comparative steels Nos. 21 to 25, after heating the thick plate-like specimen of 10 mm×10 mm×3 mm at 850° C. for 500 hours in air. Thus, oxidation resistance was drastically improved.

This is considered as follows. A growth of a spinel-type oxide layer at an utmost surface was suppressed by reduction of Mn in addition to indispensably added Cu and W, and an internal oxidation was sufficiently suppressed by reduction of Si and Al. Thus, a Cr oxide layer as a protection layer was reduced in thickness and densified.

Comparing with the comparative steel No. 25 disclosed in Patent Literature 1 and the comparative steels Nos. 23 and 24, the oxidation weight gains of the steels according to the invention were significantly small even though the amounts of Al and Si were equal. It is considered that suppressing of the growth of the spinel-type oxides containing Mn is most effective for improving oxidation resistance. As described above, the steels according to the invention having improved oxidation resistance had a small electrical resistance at 750° since the steels prevent substantially anomalous oxidation compared with the comparative steel No. 25 disclosed in Patent Literature 1. Moreover, the comparative steel No. 29 has a comparable amount of impurity and Mn but is free of W, and it exhibited a large oxidation weight gain. Thus, it was found that an effect of suppressing outward diffusion of Cr by adding W and an effect of Cu was clear. Thus, it seems that addition of W and Cu simultaneously is effective for improving oxidation resistance.

Furthermore, the steels according to the invention exhibited smaller oxidation weight gains compared with those of comparative steels Nos. 27 and 28 containing Mo which atomic ratio is equal to more than an amount of W in the steel according to the invention. Thus, it is thought that W has more effect for suppressing anomalous oxidation than Mo.

Figure 2:
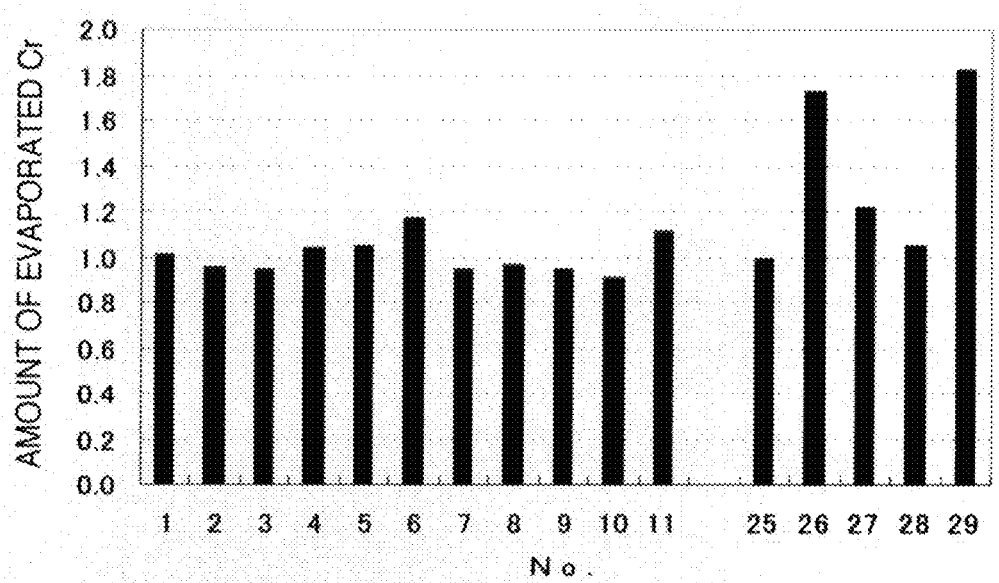
FIG. 2 is a diagram showing a test result of evaporated amount of Cr.

FIG. 2 shows amounts of evaporated Cr when thick plate-like specimens having a shape of 10 mm×10 mm×3 mm were heated at 850° C. for 30 hours in air, as a relative value when a value for the comparative steel No. 25 is set to be 1.

As shown in FIG. 2, Cr evaporation of the comparative steel No. 25, which is used as the reference, is suppressed due to a thick spinel-type oxide layer containing Mn at an utmost surface formed through an oxidation treatment, since an amount of Mn is higher compared with the steels according to the invention and the comparative steel No. 26. But, an oxidation weight gain is increased as shown in FIG. 1 since the spinel-type oxide layer has a high oxidation rate.

An amount of evaporated Cr in the comparative steel No. 26 is increased. This is because a thickness of a spinel-type oxide layer at an utmost surface of the comparative steel No. 26 is reduced by decreasing an amount of Mn to improve oxidation resistance. In contrast, the steels according to the invention have a spinel-type oxide layer of the same thickness with the comparative steel No. 26 and are added with Cu. But, the steels according to the invention exhibited a decreased level of Cr evaporation equal to or lower than that of comparative steel No. 25. This is considered since the spinel-type oxide layer containing Mn was densified by the addition of Cu.

INDUSTRIAL APPLICABILITY

The steel according to the invention has good oxidation resistance even after heating for long hours at around 700 to 900° C. The steel also forms oxide layers having good electrical conductivity and effect of suppressing Cr evaporation in this temperature range, and has a thermal expansion which has small difference with ceramics. Therefore, it can be processed into various shapes such as steel bar, wire, powder, powder sintered metals, porous metals, or steel foil, which are used for a part for solid oxide fuel cells for which oxidation resistance is required, and for any other applications for which similar properties are required.

The invention claimed is:
1. A member for solid oxide fuel cells having an improved oxidation resistance, consisting of, by mass percent,
C: not more than 0.05%,
Al: not more than 0.05%,
Si: not more than 0.05%,
Mn: 0.1 to 0.35%,
Cr: 21.0 to 25.0%,
Ni: 0.2 to 0.8%,
La: 0.005 to 0.10%,
Zr: 0.01 to 0.80%, where La+Zr: 0.01 to 0.85%,
W: 1.0 to 2.5%,
Cu: 0.4 to 2.0%, and
the balance being Fe and impurities.
2. The member according to claim 1, wherein a total amount of C, Si and Al is not more than 0.12%.
3. The member according to claim 1, wherein the member comprises chromium oxide layer on a surface of the member, the chromium oxide layer having a two-layer structure including a $Cr_2O_3$ oxide layer and a spinel-type oxide layer containing Mn on the $Cr_2O_3$ oxide layer.
4. The member according to claim 1, wherein the content of Si is not more than 0.03%.

* * * * *